(No Model.)

A. RUNSTETLER
CORN PLANTER.

No. 254,054.

Patented Feb. 21, 1882.

Attest
Jno. E. Wiles
Eugene L. Strukoss

Inventor
Andrew Runstetler,
by Wood & Boyd
his Attorneys.

UNITED STATES PATENT OFFICE.

ANDREW RUNSTETLER, OF DAYTON, OHIO, ASSIGNOR TO THE FARMERS FRIEND MANUFACTURING COMPANY, OF SAME PLACE.

CORN-PLANTER.

SPECIFICATION forming part of Letters Patent No. 254,054, dated February 21, 1882.

Application filed September 10, 1881. (No model.)

*To all whom it may concern:*

Be it known that I, ANDREW RUNSTETLER, a citizen of the United States, of Dayton, in the county of Montgomery and State of Ohio, have invented certain new and useful Improvements in Corn-Planters, of which the following is a specification.

My invention relates to an improvement in corn-planters, and refers more particularly to that class of corn-planters which have a runner-frame pivoted to a main frame supported on driving-wheels.

My invention consists in the combination, with a corn-planter having the rear frame mounted on wheels, to which is pivoted a front runner-frame, of a foot-lever pivoted to the seat-standard and connected with the rear end of the runner-frame by pendent links, for forcing the runners into the ground, and a treadle, also pivoted to the seat-standard, for raising the runners from the ground, all of which will be more fully hereinafter described.

Figure 1:
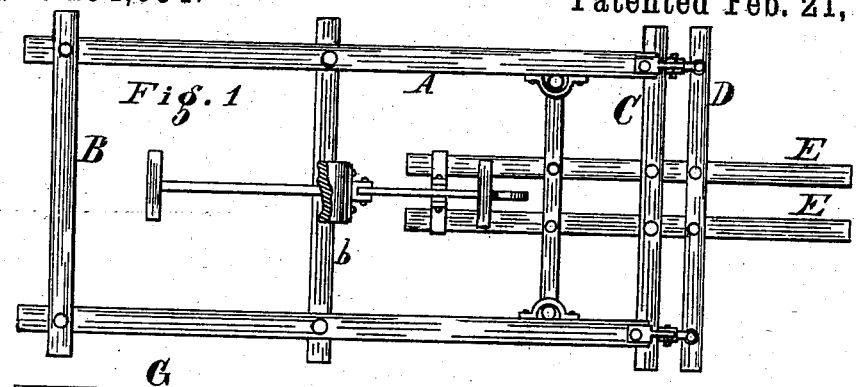
Figure 2:
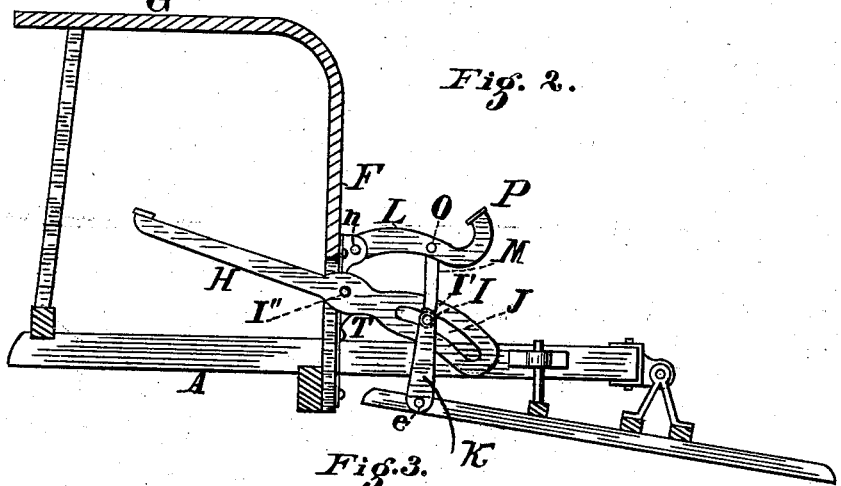
Figure 3:
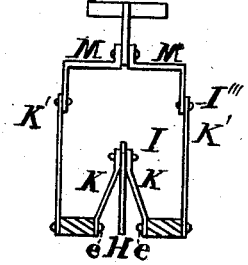

Figure 1 is a plan view of my invention. Fig. 2 is a sectional view. Fig. 3 is a modification of my improvement.

A A represent the side pieces of the main frame, which is to be supported by wheels.

B represents the cross-tie of the frame; b, the axle upon which the main frame is mounted.

C D represent cross-pieces for the hounds E E of the runner-frame.

It is not necessary to describe more fully the construction of the main and runner frames, as they are fully set forth in Letters Patent No. 231,104, granted August 10, 1880.

F represents the seat-standard; G, the seat on which the operator sits.

H represents a slotted foot-treadle, which is adapted to throw the runner-frame out of the ground.

K represents studs attached to the rear end of hounds E. They are shown as united by an axial bolt, I, which supports a roller, I', which works in slot J in the front end of treadle H.

I'' represents a pivot upon which lever H is fulcrumed.

T represents a metal bracket for attaching the treadle H to seat-standard F.

M represents link-arms, one end of which is pivoted to arms K, and the opposite end to foot-lever L.

Lever L is pivoted to the bracket T on the front side of the seat-standard by pivot n.

O represents a pivot connecting links M to lever L.

P represents a foot-rest for the driver to operate lever L and depress the rear end of runner-frame E, so as to force the runners into the ground.

Arms K and M act as links, and move freely on their pivots O, I, and e. Instead of uniting the link-arms M to arms K, as shown in Fig. 2, arms M may be pivoted to a second set of arms, K', attached to the outside of hounds E E, as shown in Fig. 3, without affecting the principle of the invention.

I intend to use lock-levers to hold the runner-frame in position, and for that purpose either locking devices shown in Letters Patent No. 228,396, granted to me June 1, 1880, or the locking devices shown in Letters Patent No. 231,104, granted August 10, 1880, to M. Runstetler, may be employed.

Very important advantages are obtained in the employment of the compound foot-lever here shown and described. By the use of this lever the operator can much more easily control the device than with the form of lever shown in said prior patents.

I do not wish to be understood as broadly claiming a corn-planter in which the rear frame is mounted on wheels, and to which is pivoted a front runner-frame, the rear end of the runner-frame being connected with a lever, by which the runner-frame can be forced into the ground or lifted therefrom.

I claim—

1. In a corn-planter having the rear frame mounted on driving-wheels, to which is pivoted a front runner-frame, the foot-lever L, pivoted to the front of the seat-standard and connected with the rear end of the runner-frame by pendent links, for forcing the runners into the ground, in combination with the independent treadle H, also pivoted to the seat-standard for raising the runners from the ground, substantially as described.

2. The foot-lever L, pivoted to the front of the driver's seat, and connected to the rear end of the runner-frame by means of link-connections K M, all substantially as herein set forth.

In testimony whereof I have hereunto set my hand in the presence of two subscribing witnesses.

ANDREW RUNSTETLER.

Witnesses:
EUGENE L. FIRNKOESS,
J. H. CHARLES SMITH.